(12) United States Patent
Seidlitz et al.

(10) Patent No.: US 11,599,090 B2
(45) Date of Patent: Mar. 7, 2023

(54) SYSTEM AND METHOD OF NETWORK SYNCHRONIZED TIME IN SAFETY APPLICATIONS

(71) Applicant: Rockwell Automation Technologies, Inc., Mayfield Heights, OH (US)

(72) Inventors: Steven T. Seidlitz, Eagle, WI (US); Mark A. Chaffee, Boulder, CO (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 143 days.

(21) Appl. No.: 17/037,940

(22) Filed: Sep. 30, 2020

(65) Prior Publication Data
US 2022/0100172 A1    Mar. 31, 2022

(51) Int. Cl.
*G05B 19/41* (2006.01)
*H04J 3/06* (2006.01)
*G05B 19/4155* (2006.01)

(52) U.S. Cl.
CPC .......... *G05B 19/4155* (2013.01); *H04J 3/067* (2013.01); *H04J 3/0644* (2013.01); *H04J 3/0667* (2013.01); *H04J 3/0697* (2013.01); *G05B 2219/31449* (2013.01)

(58) Field of Classification Search
USPC ........................................................ 370/503
See application file for complete search history.

(56) References Cited

U.S. PATENT DOCUMENTS

| | | | | |
|---|---|---|---|---|
| 9,673,970 | B1* | 6/2017 | Aweya ................. | H04L 43/106 |
| 2006/0051157 | A1* | 3/2006 | Bornstein .......... | G06F 11/1456 |
| | | | | 714/E11.12 |
| 2014/0188807 | A1* | 7/2014 | Al-Kiswany ....... | G06F 11/1464 |
| | | | | 707/652 |
| 2015/0071309 | A1* | 3/2015 | Aweya ................. | H04J 3/0664 |
| | | | | 370/503 |

(Continued)

FOREIGN PATENT DOCUMENTS

| | | |
|---|---|---|
| WO | 2009076908 A1 | 6/2009 |
| WO | 2010115357 A1 | 10/2010 |

OTHER PUBLICATIONS

"Common Industrial Protocol (CIP) and the family of CIP networks", by www.odva.org, published Feb. 2016, (Year: 2016).*

(Continued)

*Primary Examiner* — Gregory B Sefcheck
*Assistant Examiner* — Majid Esmaeilian
(74) *Attorney, Agent, or Firm* — Boyle Fredrickson, SC (57) ABSTRACT

To improve integrity of time synchronization, a node in the safety rated system takes steps to ensure the time to which it is synchronized has not become corrupted. The node receives a synchronize request message from an adjacent network device, which includes the master time, and the node generates an offset value corresponding to a difference between a local time and the master time. The node stores the offset time into a safety memory to ensure that the offset value has data integrity and does not become corrupted. The node performs periodic skew detection between two devices (Continued)

to verify that the clocks remain synchronized. In addition, the node performs a local drift detection to detect if the frequency of the local oscillator on which the local clock value is based begins to change.

17 Claims, 4 Drawing Sheets

(56) References Cited

U.S. PATENT DOCUMENTS

| | | | |
|---|---|---|---|
| 2015/0257024 A1* | 9/2015 | Baid | H04W 76/22 370/338 |
| 2016/0170439 A1* | 6/2016 | Aweya | H04L 69/28 713/401 |
| 2016/0315756 A1* | 10/2016 | Tenea | H04J 3/0667 |
| 2017/0346588 A1* | 11/2017 | Prins | H04J 3/0667 |
| 2018/0040373 A1* | 2/2018 | Watanabe | G11C 15/04 |
| 2020/0021378 A1* | 1/2020 | Aweya | H04J 3/0673 |
| 2020/0195363 A1 | 6/2020 | Wang et al. | |

OTHER PUBLICATIONS

ODVA, Inc.; "Common Industrial Protocol (CIP™) and the Family of CIP Networks"; Publication No. PUB00123R1 dated Feb. 2016—(134) pages.

Endrun Technologies; "Precision Time Protocol (PTP/IEEE-1588)"; www.endruntechnologies.com—(6) pages.

Extended European Search Report dated Feb. 21, 2022; Application No./Patent No. 21195566.1-1205—(8) pages.

* cited by examiner

SYSTEM AND METHOD OF NETWORK SYNCHRONIZED TIME IN SAFETY APPLICATIONS

BACKGROUND INFORMATION

The subject matter disclosed herein relates to use of network synchronized time in safety functions and, more specifically, to providing safety level integrity of time-stamped data within an industrial control system.

Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Under the direction of a stored program, the industrial controller examines a series of inputs from sensors corresponding to the status of the controlled process and changes a series of outputs to actuators controlling the industrial process. The sensor inputs may be binary, that is on or off, for example, from a limit switch, or may be analog, that is, providing a multi-valued output that may vary within a continuous range, for example, from a temperature sensor, camera, or the like. Similarly, the actuator outputs may be binary, for example, controlling a solenoid or shut off valve, or analog controlling a metering valve, motor, linear positioning element, or the like. Typically, analog signals are converted to binary words for processing.

An important application of industrial controllers is in "safety control". Safety control is used in applications where failure of an industrial controller can create a risk of injury to humans. While safety control is closely related to reliability, safety control places additional emphasis on ensuring correct operation even if it reduces equipment availability. Safety industrial control systems are not optimized for "availability", that is being able to function for long periods of time without error, but rather for "safety" which is being able to accurately detect error to shut down. Safety industrial controllers normally provide a predetermined safe state for their outputs upon a safety shutdown, the predetermined values of these outputs being intended to put the industrial process into its safest static mode. For that reason, safety controllers may provide run time diagnostic capabilities to detect incorrect operation and to move the control system to a predefined "safety states" if a failure is detected. The safety states will depend on the particular process being implemented and causes the actuators to assume a state predetermined to be safest when control correctness cannot be ensured. For example, an actuator controlling cutting machinery might move that machinery to a stop state while an actuator providing air filtration might retain that machinery in an on state.

Safety control capability may be designated, for example, by "safety integrity levels" (SIL) defined under standard IEC 61508 and administered by the International Electrotechnical Commission (IEC) under rule hereby incorporated by reference. Standard IEC EN 61508 defines four SIL levels of SIL-1 to SIL-4 with higher numbers representing higher amounts of risk reduction. Obtaining a desired SIL rating requires a certain degree of diagnostic coverage for components within a system. The degree of diagnostic coverage is defined according to a percentage likelihood that a failure of a component within a system will be detected. Low diagnostic coverage, for example, may require only a sixty percent (60%) chance that a failure will be detected. In contrast, high diagnostic coverage, required for a SIL 3 rating, may require a ninety-nine percent (99%) chance that a failure will be detected. Mitigation of a risk occurring increases the SIL rating and may be achieved by detecting a failure in a system that may cause a dangerous failure before the failure can occur. Therefore, determination of a SIL rating is based, at least in part, on the ability of a system to detect a fault condition and enter a safe state in response to detecting the fault condition.

Generally, the controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, ControlNet or EtherNet/IP) differ from standard communication networks (such as Ethernet) by guaranteeing maximum communication delays by pre-scheduling the communication capacity of the network, and/or providing redundant communication capabilities for high-availability.

Control networks can also employ "connected messaging" in which the bandwidth of the network and buffer space is pre-allocated to dedicated "connections" to prevent lost or unpredictably delayed data transfer that can occur in standard network protocols such as Ethernet. An example of connected messaging is Common Industrial Protocol (CIP), which is a media independent industrial protocol for industrial automation applications supported by the Open DeviceNet Vendors Association (ODVA). CIP is described in "Common Industrial Protocol (CIP) and the Family of CIP Networks," published by ODVA with the most recent version dated February 2016, which document is incorporated herein by reference in its entirety.

One potential source of failure in a controlled system is the control network. A failure in a network device or a damaged network cable could result in the loss of communication with one or more sensors or actuators. The industrial controller could stop receiving updates on the operating status of a portion of the controlled machine or process and may be unable to detect when a particular action is required. Similarly, an output signal from the industrial controller may fail to reach actuator, resulting in unexpected operation of the controller machine or process. Thus, it is desirable to detect failures in the control network.

Historically, it has been known to obtain a safety rating on a control network in one of two methods. A first method is sometimes referred to as a "white box" method of detecting failures. In the white box method, every device on the control network is configured to satisfy the desired safety rating. These devices may include, for example, redundant network paths, redundant controllers, and programs executing within the devices to continually test operation of the device and the network paths. Often the tests will send a brief safety check message along both network paths and compare reception of each message to verify correct operation of the path. Having redundant systems allows correct operation of the controlled machine or process to continue in the event of a failure of one path in the control network by utilizing the redundant path that is still operating. In the event of a failure in any aspect of the network, appropriate action may be taken to enter a safe operating condition before unexpected operation may occur. However, a white box system requires significant expense to ensure that every component within the network complies with a desired SIL rating.

A second method for obtaining a SIL rating on the control network is sometimes referred to as a "black channel" method of detecting failures. In the black channel method, only certain nodes in a network are considered essential for obtaining a desired safety rating and the intermediate network devices are not required to comply with the desired safety rating. These intermediate network devices form the "black" channel between the "white" devices. As previously indicated, obtaining a desired SIL rating involves mitigating risk that a dangerous failure occurs in the event of a failure. Therefore, to obtain a desired safety rating, the white devices must be configured to detect a failure occurring on the black channel.

Currently, the safety rated nodes are able to detect the occurrence of certain failures such as the failure of an intermediate network device or the loss of a network cable. Two safety rated nodes may periodically transmit a data packet between each other. The loss of this periodic data packet indicates the loss of a network device or of a network cable between the two devices. However, other failures along the black channel may go undetected. For example, certain applications may require time synchronous operation. All devices in the network include an internal clock which is synchronized to a master clock. A first device in the network may rely on timestamps of events occurring at other devices to coordinate actions taken by the first device. The timestamp, however, of a black channel device may be susceptible to error. An incorrect bit may be written, a valid timestamp may be overwritten by other data, or some other failure may occur to corrupt the timestamp. Because devices are synchronized to a clock signal sequentially along a network, a safety rated node may need to be synchronized to the clock signal from a device along the black channel. The potential for an error in the clock signal may limit the ability to utilize time synchronization in a safety rated application.

Thus, it would be desirable to provide a system and method for using time synchronization in a safety rated application.

BRIEF DESCRIPTION

According to one embodiment of the invention, a method of generating a safety rated time value for use in a safety rated application is disclosed. A synchronize request message is received from a first device with a second device, and a first timestamp, corresponding to a transmission time of the synchronize request message, is also received at the second device. The first timestamp corresponds to a clock in the first device. A second timestamp is generated in the second device upon receipt of the synchronize request message. The second timestamp corresponds to a clock in the second device. A delay time request message is transmitted from the second device to the first device, and a third timestamp is generated in the second device corresponding to a transmission time of the delay time request message, where the third timestamp corresponds to the clock in the second device. A fourth timestamp is generated in the first device upon receipt of the delay time request message, where the fourth timestamp corresponds to the clock in the first device, and the fourth timestamp is transmitted from the first device to the second device. An offset time value between the clock in the first device and the clock in the second device is determined as a function of the first timestamp, the second timestamp, the third timestamp, and the fourth timestamp. The offset time value in a standard memory of the second device, and a copy of the offset time value is stored in a safety memory of the second device.

According to another embodiment of the invention, a node in an industrial control system configured to generate a safety rated time value for use in a safety rated application is disclosed. The node includes a communication port, a clock circuit, and a processor. The communication port is configured to connect to an industrial network, receive a synchronize request message from a first device via the industrial network, and receive a first timestamp from the first device. The first timestamp corresponds to a time signal in the first device at which the synchronize request message was transmitted. The clock circuit generates a local time signal. The processor is configured to generate a delay time request message for transmission to the first device via the industrial network, and determine an offset time value between the time signal in the first device and the local time signal as a function of the first timestamp, a second timestamp, a third timestamp, a fourth timestamp. The second timestamp is a function of the local time signal and corresponds to the node receiving the synchronize request message. The third timestamp is a function of the local time signal and corresponds to transmission of the delay time request. The fourth timestamp is received from the first device, corresponds to the time signal in the first device, and corresponds to reception of the delay time request at the first device. A safety memory in the node is configured to store a copy of the offset time value.

According to still another embodiment of the invention, a method of generating a safety rated time value for use in a safety rated application is disclosed. An offset time value between a master clock and a device in the safety rated application is determined, and the offset time value is stored in a safety memory of the device. A local time value is read from a clock circuit in the device, and the safety rated time is generated as a function of the local time value and of the offset time stored in the safety memory of the device.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for using time synchronization in a safety rated application. Time synchronization occurs on a device-by-device basis. The master device generates an initial time synchronization request and sends out the synchronization request to a device that is adjacent to the master device on the network. Adjacent with respect to the network means one device is connected to another directly via a network cable or wireless connection without having the synchronization request pass through another device, such as a switch, router, gateway, or the like. The adjacent device first synchronizes its clock to the master time and then sends out subsequent synchronization requests to the next adjacent device on the network. The master device is commonly connected to the Global Positioning System (GPS) from which it obtains an initial clock time.

Within a safety rated application, a control system may include many nodes. One node may be an industrial controller such as a programmable logic controller (PLC) or a programmable activity controller (PAC). Additional nodes in the industrial control system may include, for example, remote Input/Output (I/O) racks, motor drives, or even certain sensor and actuators within the controlled machine or process. The nodes may be configured according to a desired safety rating while network cables and other network devices may be positioned between nodes. The network cables and other network devices define the industrial network and act as a "black" channel between "white" devices in a safety rated system.

In order to improve integrity of time synchronization, a node in the safety rated system takes steps to ensure that the time to which it is synchronized has not become corrupted. As an initial step, the node receives a synchronize request message from an adjacent network device. The synchronize request message includes the master time to which each node is to synchronize. The adjacent network device may or may not be another white device within the safety rated system. The node generates a timestamp corresponding to a time at which the synchronize request message is received and also receives a timestamp corresponding to the time at which the synchronize request message was transmitted. From these two timestamps, the node is able to determine a transmission delay time from the adjacent device to the node. The node, in turn, sends a delay time request to the adjacent node from which it received the synchronize request message. The node timestamps when this message is sent and stores the timestamp in memory. The first node timestamps when the message is received and sends a response message back to the node which includes the second timestamp. From the two timestamps, the node is now able to determine a transmission delay time from the node to the adjacent device. The node may utilize an average value of a difference between the two delay times as an offset between the clock values of the two devices. This offset value is stored in a safety memory within the node to ensure that the average value has data integrity and does not become corrupted. The offset value, in combination with the local time, can be used to determine timestamps of events within the node.

Figure 1:
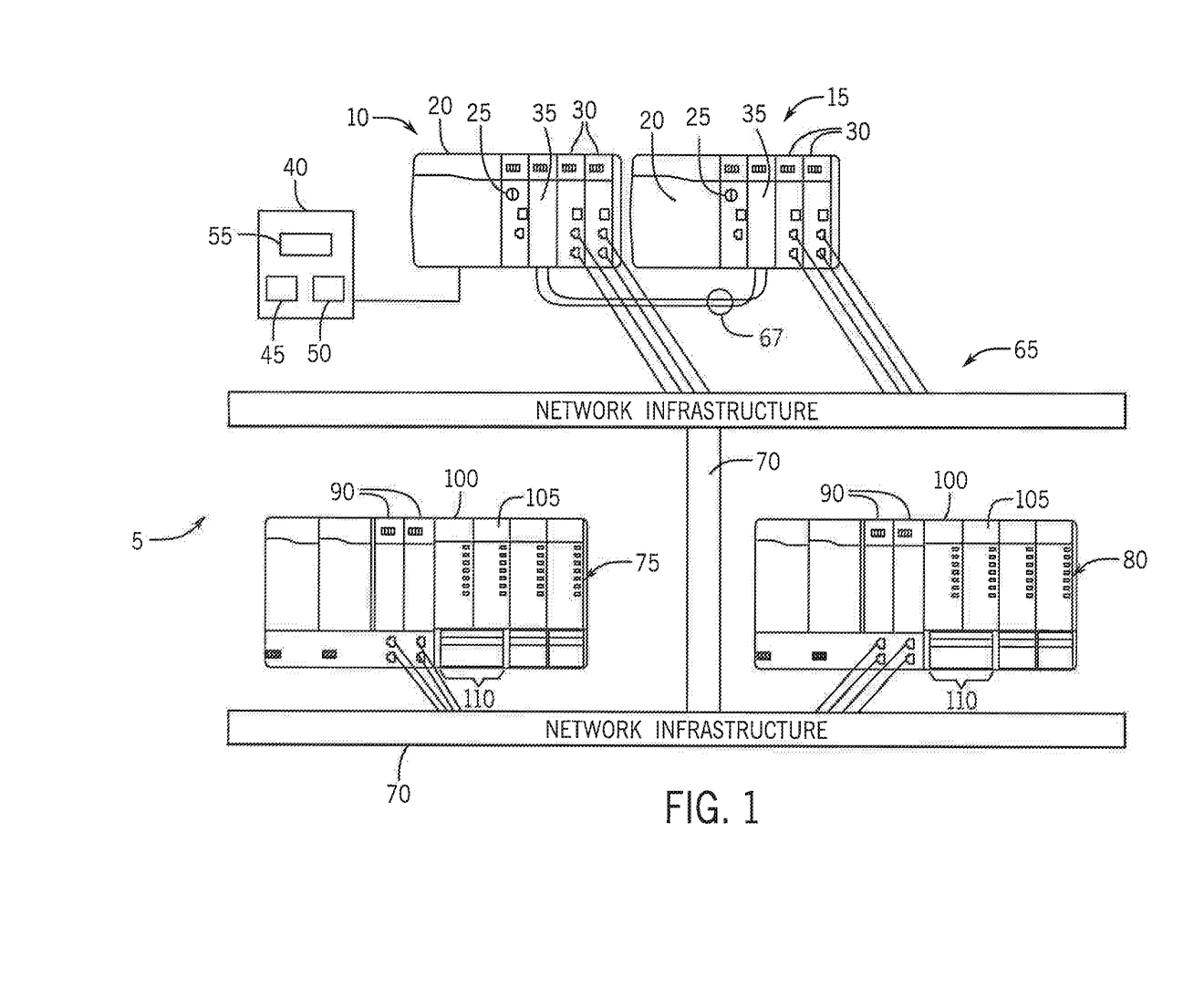
FIG. 1 is a block diagram of one embodiment of an industrial control system.
Figure 2:
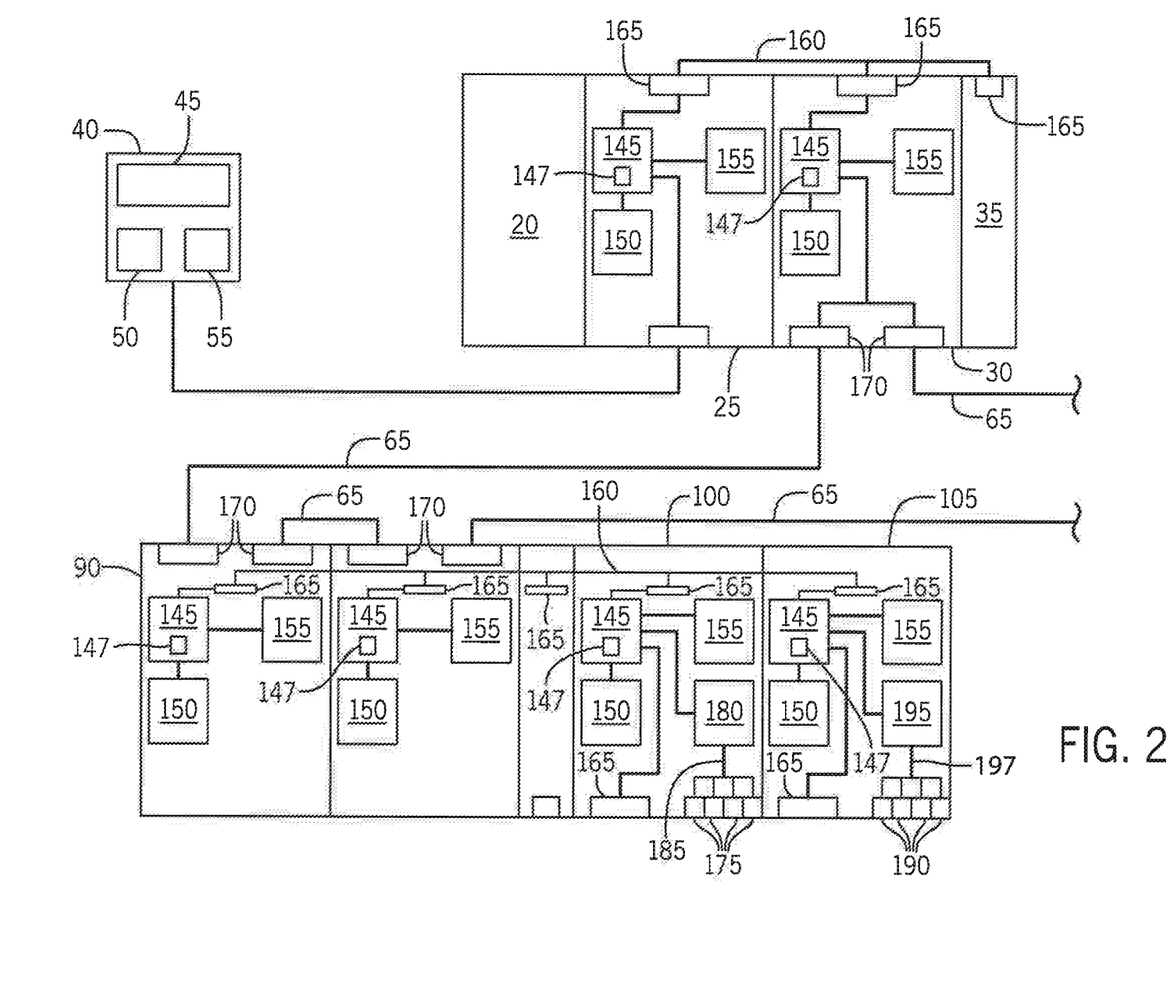
FIG. 2 is a block diagram further representing aspects of the industrial control system of FIG. 1.

Turning first to FIG. 1 and FIG. 2, an exemplary industrial control system 5 with redundant subsystems is illustrated. The redundant subsystems may be provided to achieve a desired safety rating, where inputs and outputs are provided to two controllers and each controller monitors operation of the inputs and outputs as well as operation of the other controller to ensure correct operation of the control system 5.

The industrial control system 5 includes a first controller chassis 10 and a second controller chassis 15. As illustrated, the first and second controller chassis 10 and 15 are modular and may be made up of numerous different modules. Additional modules may be added or existing modules removed and the first and second controller chassis 10 and 15 reconfigured to accommodate the new configuration. Optionally, either the first controller chassis 10 and/or the second controller chassis 15 may have a predetermined and fixed configuration. The first and second controller chassis 10 and 15 may have a single backplane or dual backplanes to facilitate communication between modules in the chassis. In the exemplary system shown, both the first and second controller chassis 10 and 15 include a power supply module 20, a controller module (or also referred to as simply "controller") 25, and network bridge modules 30. Each controller chassis 10 and 15 is further shown with an additional module 35 that may be selected according to the application requirements. For example, the additional module 35 may be an analog or digital input or output module, which will be referred to herein generally as an IO module. Optionally, each chassis may be configured to have multiple additional modules 35 according to the application requirements. For ease of illustration, a single additional module 35 is illustrated and the illustrated module is a redundancy module to facilitate dual chassis controller redundancy.

An operator interface 40 is shown connected to the industrial control system. The operator interface 40 can include a processing device 45 and an input device 50. The input device 50 can include, but not limited to, a keyboard, touchpad, mouse, track ball, or touch screen. The operator interface can further include an output device 55. The output device 55 can include, but is not limited to, a display, a speaker, or a printer. It is contemplated that each component of the operator interface 40 may be incorporated into a single unit, such as an industrial computer, laptop, or tablet computer. It is further contemplated that multiple operator interfaces can be distributed about the industrial control system 5. The operator interface 40 may be used to display operating parameters and/or conditions of the controlled machine or process, receive commands from the operator, or change and/or load a control program or configuration parameters. An interface cable connects the operator interface 40 to the controller 25 on the first controller chassis 10.

The first and second controller chassis 10 and 15 are connected to other devices by a network 65 according to the application requirements. A redundant network topology is established by connecting the network bridge modules 30 of the controller chassis 10 and 15 to a redundant network infrastructure 70 by a suitable network of cables and/or network devices, such as router, switches, gateways, or the like. The network infrastructure 70 connects to a first remote chassis 75 and a second remote chassis 80. It is contemplated that the network cables may be custom cables configured to communicate via a proprietary interface or may be any standard industrial network, including, but not limited to, Ethernet/IP®, DeviceNet®, ControlNet®, or OPC UA®. The network bridge modules 30 and the network 70 are configured to communicate according to the protocol of the network to which it is connected and may be further configured to translate messages between two different network protocols. Dedicated interface cables 67 connect the redundancy modules 35 in each chassis to each other, providing a dedicated communication channel between the controller modules 25.

The first and second remote chassis 75 and 80 are positioned at varying positions about the controlled machine or process. As illustrated, the first and second remote chassis 75 and 80 are modular and may be made up of numerous different modules connected together in a chassis or mounted on a rail. Additional modules may be added or existing modules removed and the remote chassis 75 or 80 reconfigured to accommodate the new configuration. Optionally, the first and second remote chassis 75 and 80 may have a predetermined and fixed configuration. The first and second remote chassis 75 and 80 may have a single backplane or dual backplanes to facilitate communication between modules in the chassis. As illustrated, the first and second remote chassis 75 and 80 each includes a pair of network adapter modules 90, an input module 100, and an output module 105. Each network adapter module 90 is connected to the redundant network infrastructure 70 by a suitable network of cables. Each of the input modules 100 is configured to receive input signals from controlled devices, and each of the output modules 105 is configured to provide output signals to the controlled devices. Optionally, still other modules may be included in a remote chassis. Dual or triple redundant input modules 100 and/or output modules 105 may be included in a remote and/or controller chassis. It is understood that the industrial control network, industrial controller, and remote chassis may take numerous other forms and configurations without deviating from the scope of the invention. It should also be understood that an input module 100 and an output module 105 can form an IO module 110.

Referring next to FIG. 2, a portion of the exemplary industrial control system of FIG. 1 is illustrated in block diagram form. It is contemplated that each of the modules in the system may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The processors 145 include random access memory 147 for processing runtime data. The memory devices 150 are non-transitory storage mediums that may be a single device, multiple devices, or may be incorporated in part or in whole within the FPGA or ASIC. Each of the modules also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between modules mounted in the same chassis or contained within a single housing occurs via a backplane 160. The backplane 160 may be a single backplane or dual backplanes and include a corresponding backplane connector 165. Modules communicating via network media include ports 170 configured to process the corresponding network protocol. The input module 100 includes input terminals 175 configured to receive the input signals from the controlled devices. The input module 100 also includes any associated logic circuitry 180 and internal connections 185 required to process and transfer the input signals from the input terminals 175 to the processor 145. Similarly, each output module 105 includes output terminals 190 configured to transmit the output signals to the controlled devices. The output module 105 also includes any associated logic circuitry 195 and internal connections 197 required to process and transfer the output signals from the processor 145 to the output terminals 190.

Figure 3:
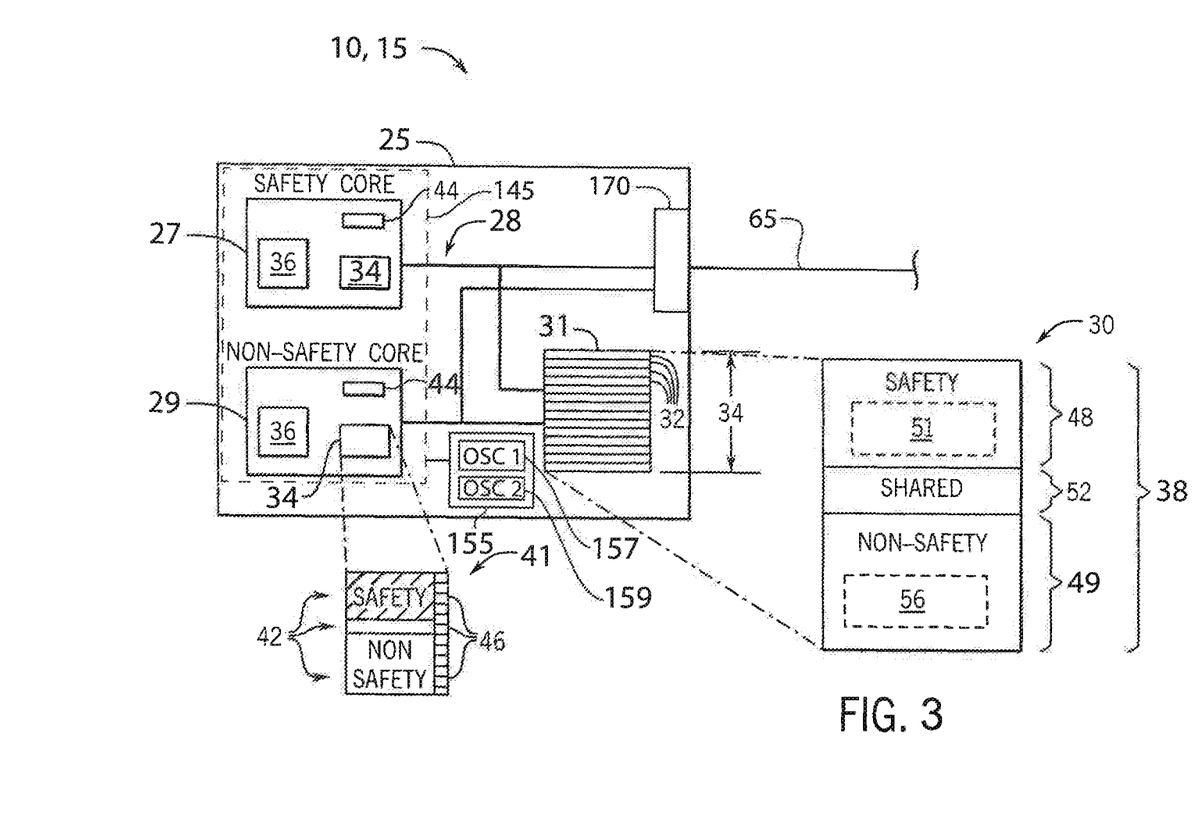
FIG. 3 is a block diagram of an exemplary controller module for the industrial control system of FIG. 1 for executing safety and non-safety tasks.

Turning next to FIG. 3, it is contemplated that the controller module 25 for each controller chassis 10, 15 may include two different processing cores 27 and 29. For descriptive clarity, at times the first processing core will be termed the "safety core" 27 and the second processing core will be termed the "non-safety" core 29. Generally, these cores 27 and 29 have similar or identical hardware and differ primarily with respect to the programs they execute. In one embodiment, cores 27 and 29 may be different cores on a standard multicore microprocessor. Optionally, the cores 27, 29 may be specialized different cores (for example, having diverse architectures to reduce the chance of correlated errors) or the cores may be implemented on separate microprocessors.

In a general case, each of the cores 27 and 29 share a bus structure 28 communicating with shared memory 31. The shared memory 33 will generally include a memory hierarchy, for example, an L2 or higher level cache, RAM, and mass storage in the form of a disk or solid-state disk. Each of the structures will be treated logically, that is as a single memory space having multiple addresses 32 within an address range 38, for descriptive clarity.

Each of the cores 27 and 29 will include a central processing unit (CPU) 36 and a memory management unit (MMU) 34. In some embodiments, the MMU 34 may implement multiple functions including address translation (between virtual and physical addresses) as well as memory protection. For both functions, the memory management units 34 may include a page table 41 having a set of entries 42 having a one-to-one mapping to individual addresses 32 or address ranges (typically blocks of addresses 32). These entries 42 may provide for the translation between virtual and physical address of a type known in the art for which purpose the MMU 34 may be associated with a translate lookaside buffer 44 providing caching operations for improved translation speed.

In addition, each of the entries 42 may be associated with a flag 46 describing whether the non-safety core 29 has write privileges with respect to writing to the particular addresses of the entry. These flags 46 of the page table 41 of each MMU 34 of each of the cores 27 and 29 may be used to segregate the memory 31 into exclusive regions for the safety memory or non-safety memory. Generally, the flags 46 may define a safety region 48 where there are write privileges only with respect to safety core 27 and a non-safety region 49 and where there are write privileges only with respect to the non-safety core 29. The flags 46 may further define a shared region 52 where both cores 27 and 29 have write privileges. The safety region 48 may hold a safety program 51 executed by safety core 27 to provide for safe control of the controlled process through a reading of sensors and a writing of actuators and may include a data space holding data associated with that safety program 51. Similarly, the non-safety region 49 may hold a non-safety program 56 associated with the non-safety aspects of the control tasks executed by non-safety core 29. In addition to limiting access to the safety memory 48 by the safety core 27, additional steps may be taken during reads or writes of the safety memory such as addition of a checksum to data written in the safety memory 48 and verifying that the checksum is correct when data is read from the safety memory 48 to ensure that the data in the safety memory and utilized by the safety core 27 has not been corrupted. The additional care taken with respect to reading and writing safety memory 48 is intended to satisfy safety requirements and to achieve desired SIL ratings.

In operation, "white" devices in the industrial control system 5 are configured to ensure the integrity of the synchronized time value in a safety application. As discussed above, the "white" devices are configured to achieve a desired safety rating. In certain applications, a timestamp for the occurrence of an event in these "white" devices may be desired. It would be desirable to ensure the synchronized time value is accurate and, in the event of an error occurs in the synchronized time value, that the error is detected and/or corrected without causing a failure in the application.

As an initial step, the time in each of the devices must be synchronized to a master clock. It is contemplated that either the first or second industrial controller 10, 15 may provide the master time. The clock in the first controller module 25 or in the second controller module 25 may be defined as the master clock. Optionally, the first or second controller module or a separate module within the first or second industrial controller rack 10, 15 may be in communication with a GPS satellite to obtain a master time. Having defined or obtained a master clock value, the other devices in the system will be synchronized to the master clock. A synchronize request data packet is transmitted from the device with the master time to an adjacent device in the industrial network. Each device in series along the industrial network 65 synchronizes its clock to the master clock and, in turn, transmits a new synchronize request to the next adjacent device in the network until all of the devices in the controlled machine or process are synchronized to the master clock.

Figure 4:
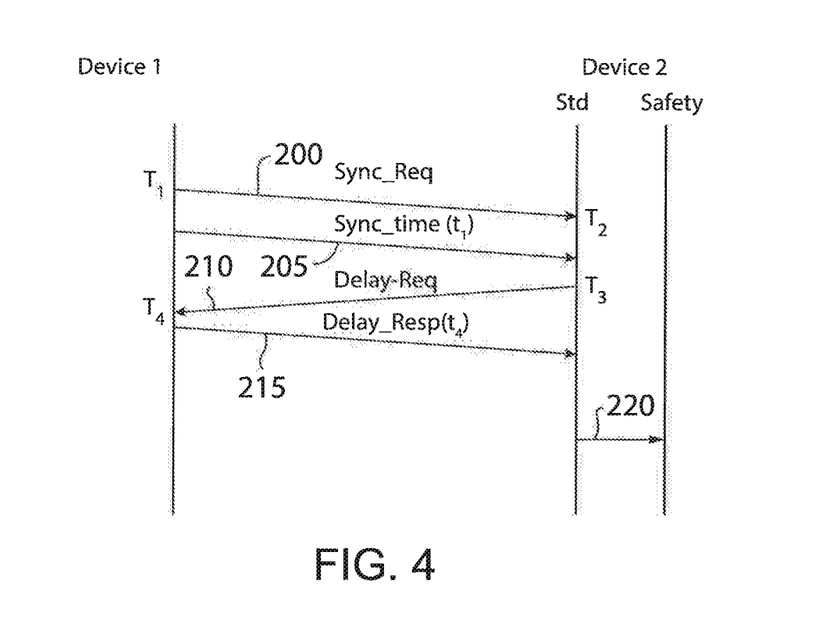
FIG. 4 is a timing diagram illustrating one embodiment of time synchronization between two devices.

With reference to FIG. 4, an example of time synchronization between two devices in the industrial control system 5 is illustrated. Device 1 may be any device within the control system 5 transmitting a synchronize request message 200 to the next adjacent device, Device 2, along the network 65. The synchronize request message 200 is transmitted at time, $t_1$. Device 1 captures a timestamp of time, $t_1$, using its previously synchronized clock 155. According to one aspect of the invention, the processor 145 in Device 1 may capture the timestamp at the time it sends the synchronize request message 200 to its corresponding communication port 170 for transmission. According to another aspect of the invention, it is contemplated that the communication port 170 or a dedicated circuit located between the processor 145 and the communication port 170 may be configured to capture a timestamp utilizing a hardware circuit. Implementing a hardware circuit to capture a timestamp may allow for a more precise timestamp corresponding to the time the synchronize request message 200 leaves Device 1. Because the timestamp is captured as close as possible to the time the message leaves Device 1, the timestamp may not be included within the synchronize request message 200. Device 1 transmits a second message, Sync_time, with the timestamp, $t_1$, included in the data packet. Optionally, the hardware circuit may be configured to append the timestamp, $t_1$, to the initial synchronize request message 200 if the timestamp may be appended quickly enough to not delay the transmission of the request message 200 beyond the application requirements.

Device 2 receives the synchronize request message 200 at time, $t_2$, and obtains a second timestamp corresponding to the time the synchronize request message is received. As may be appreciated, the first timestamp, $t_1$, is captured as a function of the local time in Device 1, which has been synchronized to the master time, and the second timestamp, $t_2$, is captured as a function of the local time in Device 2, which has not yet been synchronized to the master time. As a result, there will be an offset between the local times in the two devices. According to one aspect of the invention, the processor 145 in Device 2 may capture the timestamp at the time it receives the synchronize request message 200 from its corresponding communication port 170. According to another aspect of the invention, it is contemplated that the communication port 170 or a dedicated circuit located between the processor 145 and the communication port 170 may be configured to capture a timestamp utilizing a hardware circuit. Implementing a hardware circuit to capture a timestamp may allow for a more precise timestamp corresponding to the time the synchronize request message 200 arrives at Device 2. Device 2 also receives the second message, Sync_time, with the timestamp, $t_1$, included in the data packet. Device 2 may store the first and second timestamps in memory 33. Receiving data messages and capturing timestamps may be executed by standard tasks and utilize the non-safety memory 49. Consequently, the first and second timestamps may be stored in non-safety memory 49 for later use.

Device 2 then determines a transmission delay time for a message sent from Device 2 to Device 1. A delay request message 210 is generated within Device 2 and sent from the communication port 170 of Device 2 to Device 1. Device 2 captures a third timestamp, $t_3$, using the local time in Device 2, where the third timestamp corresponds to the time that the delay request message was transmitted. As previously discussed, either the processor 145 in Device 2 or a hardware circuit in the communication port 170 or a dedicated circuit located between the processor 145 and the communication port 170 may be configured to capture the timestamp. The third timestamp, $t_3$, is stored with the first and second timestamps. The delay request message 210 is received at Device 1 at time, $t_4$. The processor 145 in Device 1 or a hardware circuit in the communication port 170 or a dedicated circuit located between the processor 145 and the communication port 170 may be configured to capture the timestamp of the time the delay request message 210 is received. Device 1 then sends a delay response message 215 back to Device 2, where the delay response message included the fourth timestamp, $t_4$. Device 2 receives the fourth timestamp and stores it with the first three timestamps.

Device 2 may then use the four timestamps to determine a time offset for the local time in Device 2 from the master time. The third timestamp, $t_3$, is captured as a function of the local time in Device 2, which has not yet been synchronized to the master time, and the fourth timestamp, $t_4$, is captured as a function of the local time in Device 1, which has been synchronized to the master time. As a result, there will be an offset between the local times in the two devices. The offset may be determined as shown below in equation 1.

$$\text{offset} = ((t_2 - t_1) - (t_4 - t_3))/2 \qquad (1)$$

In equation 1, the transmission delay is determined from Device 1 to Device 2 for the synchronize request message 200 and from Device 2 to Device 1 for the delay request message 210. Subtracting the two values of the transmission delay where the transmission delays are determined using clock values from different local clocks has the effect of cancelling out the transmission delay and leaving a remainder of twice the offset between the two clocks. As a result, dividing the difference of the transmission delay values by two provides the offset value between the local clock values of the two devices. If Device 1 has already been synchronized to the master clock, Device 2 will now have an offset value for its local time with respect to the master clock value and can synchronize itself to the master clock.

Having determined the offset value, Device 2 can store a copy of the offset value into safety memory 48 as shown by the write 220 between standard and safety memory in the timing diagram of FIG. 4. A non-safety task may be utilized to manage the data packet transmissions and to store the intermediate values of the timestamps used to determine the offset value. Upon determining the offset value, the non-safety task may set an internal status bit or flag indicating that the offset value has been determined, and a safety task executing on the safety core 27 may write 220 a copy of the offset value into the safety region 48 of memory 33. Storing the offset value into the safety region 48 of memory 33 ensures the integrity of the offset value for later use by Device 2 with respect to synchronized events. The later use may be, for example, generating subsequent timestamps for events occurring at Device 2. Optionally, the later use may be triggering an event by Device 2 based on desired time for the event to occur. The use is dependent on the type of device and on the application requirements. As the offset value is written into safety memory 48, the processor 145 may generate a checksum corresponding to the value of the offset that was determined and write the checksum into safety memory 48 along with the offset value. On subsequent reads of the offset value, the processor 145 may generate a checksum of the offset value read and compare the new checksum value to the stored checksum value to ensure the integrity of the stored value. Optionally, the processor 145 may utilize other safety integrity measures when storing the offset value into safety memory 48, such as an error correcting code (ECC) or a memory protection unit (MPU) to verify that the data read has not been changed or corrupted after being written to safety memory 48.

The devices in an industrial control system 5 using synchronized time are periodically resynchronized to ensure that the local time in each device remains synchronized. It is contemplated that resynchronization may occur, for example, at intervals ranging from one-half second to five seconds. As previously discussed, a portion of the devices in the industrial control system 5 will be configured as "white" devices, or safety devices, to obtain a desired safety rating. A portion of the devices and, in particular, a portion of the devices in the industrial network 65 may be "black" devices, or non-safety devices. The non-safety devices may be off-the-shelf routers, switches, gateways, or the like and are not configured with the redundancy or fail-safe measures of a safety device and are selected to balance the safety requirements with cost, installation time, and the like. As a result, the potential exists that Device 1, as shown in FIG. 4, may be a non-safety device and Device 2 may be a safety device, where Device 2 is receiving the periodic synchronization requests 200 from Device 1. Device 1 may experience a temporary error condition, such as noise, an erroneous read or write, or the like, that causes its local time to be synchronized for at least one cycle to a time other than the master time. Device 2 may add an additional safety check with respect to its offset value by comparing the new offset value determined following each synchronization request 200 to the prior determined value. If the difference between values exceeds a predefined threshold, Device 2 may keep the prior offset value, determining an error occurred in the present resynchronization request. If the difference between values exceeds the predefined threshold for multiple cycles, Device 2 may issue a warning message indicating an error with time synchronization.

Having stored the offset value in the safety region 48 of memory 33, a safety task may be required to read the offset value when a timestamp is desired. The non-safety control program 56 may include a function call to the safety task to read the offset value. The safety task may be configured to return the offset value directly. Optionally, the safety task may be configured to return a timestamp, where the offset value has been added to the local clock value to generate a time value synchronized to the master clock time. The safety task is configured to perform the necessary integrity check on the offset value as it is read from the safety region 48, ensuring the integrity of the timestamp generated as a function of the offset value.

Figure 5:
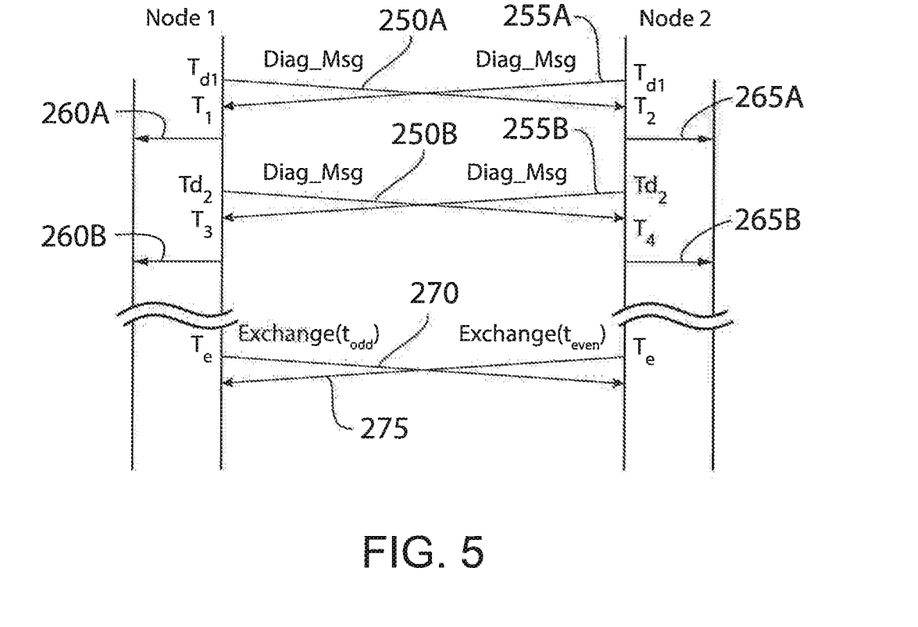
FIG. 5 is a timing diagram illustrating one embodiment of time skew detection between the devices synchronized in FIG. 4.

One problem facing all time synchronized systems is variation in the oscillator frequency between clock circuits 155. Even clock circuits constructed from identical components will have some variation due to manufacturing and material tolerances for the components within the clock circuit 155. As a result, the present invention utilizes a clock skew detection to detect variation in the value of synchronized time between safety devices. Turning next to FIG. 5, a sequence of messages may be transmitted between two safety devices to detect clock skew in a local clock. According to one aspect of the invention, it is contemplated that Node 1 shown in FIG. 5 will be the industrial controller 10 or 15 to which the second device, Node 2, is connected. Whether the industrial controller 10, 15 provides the master time or is just synchronized to the master time, the industrial controller 10, 15 will serve as the primary clock for skew detection.

When skew detection is requested, each device will transmit a diagnostic message 250, 255 at the same time, $t_{d1}$. If the clocks are properly synchronized and the transmission delay is symmetric in both directions, each device should receive the diagnostic message from the other device at the same time. In order to reduce the likelihood of an unusual transmission delay for one of the two diagnostic messages 250A, 255A causing an erroneous value of the timestamp, the skew detection routine may generate multiple diagnostic messages 250, 255 and use the receive time of the multiple messages for skew detection. As shown in FIG. 5, two of the first diagnostic messages 250A, 250B are shown and two of the second diagnostic messages 255A, 255B are shown. It is contemplated that the number of diagnostic messages 250, 255 transmitted for filtering may be configurable, ranging, for example, between two and ten. The timestamp of each first diagnostic message 250A, 250B being received is shown as an "even" timestamp (i.e., $t_2$, $t_4$, $t_6$, . . . ). The timestamp of each second diagnostic message 255A, 255B being received is shown as an "odd" timestamp (i.e., $t_1$, $t_3$, $t_5$, . . . ). The additional filtering synchronization messages are sent at a scheduled transmission time interval. The transmission time between filtering synchronization messages may be configurable according to the application requirements and may have a range, for example, from microseconds to milliseconds. According to one embodiment of the invention, the transmission interval for subsequent, filtering diagnostic messages may be set to fifty microseconds.

The skew detection interval may be scheduled during commissioning of the system. An initial skew detection process may be scheduled after each synchronization message. Subsequent skew detection processes may be scheduled to occur, for example, once or twice between each synchronization message. Because each node has had its respective local time synchronized to the master time, each node can transmit a message based on the predefined schedule and, if there has been no skew in the clock signals, each message will be transmitted at the same time. Node 1 transmits a first diagnostic message 250A to Node 2, and Node 2 transmits a second diagnostic message 255A to Node 1. Node 1 generates a first timestamp, $t_1$, using the synchronized clock value at Node 1 upon receipt of the second diagnostic message 255A, and Node 2 generates a second timestamp, $t_2$, using the synchronized clock value at Node 2 upon receipt of the first diagnostic message 250A.

If transmission delays between nodes are symmetrical in both directions and if both clocks are maintaining a synchronous time, the first timestamp and the second timestamp should match each other. A safety task executing in Node 1 executes a first write 260A to the safety region 48 of memory 33 in the first node, and a safety task executing in Node 2 executes a second write 265A to the safety region 48 of memory 33 in the second node. The two timestamps are saved in safety memory for subsequent comparison to each other. Just as with the initial synchronization messages, it is contemplated that either the processor 145 or a hardware circuit in the communication port 170 or a dedicated circuit located between the processor 145 and the communication port 170 may be configured in each node to capture the timestamp of the message as it is received. The safety task executing in Node 1, will execute subsequent writes 260 to the safety region 48 of memory in the first node for each of the odd timestamps, and the safety task executing in Node 2 executes a second write 265 to the safety region 48 of memory 33 in the second node for each of the even timestamps.

At time, $t_e$, a pair of exchange messages is transmitted between each of the two nodes. A first exchange message 270 is transmitted from Node 1 to Node 2, and a second exchange message 275 is transmitted from Node 2 to Node 1. The first exchange message 270 includes each of the odd timestamps that were previously stored in Node 1, and the second exchange message 275 includes each of the even timestamps that were previously stored in Node 2. After each node has received the opposite exchange message, both nodes will have a complete set of timestamps, including both the odd and the even timestamps. Both nodes can then perform a comparison of the corresponding timestamps. For example, the first timestamp, $t_1$, is compared to the second timestamp, $t_2$, and the third timestamp, $t_3$, is compared to the fourth timestamp, $t_4$. A difference between each of the pairs of timestamps can be found and the differences are then averaged in order to filter out any single transmission that may have an unusual transmission delay. If the averaged difference is less than a predefined threshold, the nodes have verified that the time synchronization is being maintained. If the average difference is greater than the predefined threshold, a message is generated and any necessary action according to the safety application requirements may be taken in response to detecting an excessive variation in the synchronized time between nodes.

Because the clocks of both nodes have been synchronized to a master clock, each of the diagnostic messages and the exchange message should be transmitted in tandem from each node. In order to minimize transmission delays and to improve symmetry of the transmission delay in each direction, it may be desirable to reduce other traffic on the industrial network 65 during transmission of these messages. The industrial network 65 may be configured as a time synchronized network, using, for example, a time synchronization protocol such as that under development in the IEC/IEEE 60802 network profile, such that certain time intervals are reserved for specific messages or for messages having a particular priority. The network may reserve time intervals for the diagnostic messages 250, 255 and/or the exchange messages 270, 275 to reduce the potential for other network traffic impacting the skew detection.

According to another aspect of the invention, it is contemplated that the exchange messages 270, 275 may be eliminated and timestamps may be transmitted in the diagnostic messages instead. An initial diagnostic message may be sent with no timestamp. However, each subsequent diagnostic message would include the timestamp corresponding to the time at which the diagnostic message immediately prior to the one being sent was received. Each node could be configured to perform an ongoing skew detection by comparing the last two timestamps. In order to provide filtering of the timestamp values, each node may maintain a sliding window containing the differences between multiple prior pairs of timestamps. The sliding window may contain, for example, five to ten of the prior differences and an average difference may be used.

In addition to detecting skew of the clock signals between two devices, each node may be configured to detect drift of the clock signal locally. With reference to FIG. 3, the clock circuit 155 includes a first oscillator 157 and a second oscillator 159. The first oscillator 157 is configured to generate the local time signal for each device as discussed above. The second oscillator 159 is configured to generate a diagnostic clock signal. The frequency of the first oscillator 157 and of the second oscillator 159 may be known within manufacturing tolerances and each device may include an initial expected value of the frequency. It is further contemplated that, at power up, during a commissioning step, or the like, each device may sample the oscillator frequency to determine a precise value of the corresponding oscillator frequencies. Each oscillator drives a respective free-running clock. Having a precise value of the oscillator frequency, the output of each oscillator may be scaled to drive the respective free-running clocks to the same time. Each device may execute a frequent comparison of the two free-running clocks to detect local drift of one of the two oscillators 157, 159. The frequency of comparison would coincide to a safety reaction time of the device, where the safety reaction time may be, for example, between three and ten milliseconds. Thus, the drift diagnostic may occur more frequently than the skew detection and may verify that the local clock is not drifting between comparisons of the clock frequency to the clock in another device. Because the two oscillators are local on the device and because there is no need to transmit data between devices over the network 65, the two free-running clocks should remain closely synchronized. If a difference between the two free running clocks exceeds, for example, five microseconds, an alarm message may be generated and, if the difference between the two free running clocks exceeds, for example, ten microseconds, the device may generate a fault message, indicating that the industrial controller 10, 15 should bring the controlled machine or process to a safe operating state.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method of generating a safety rated time value for use in a safety rated application, the method comprising the steps of:
receiving a synchronize request message from a first device with a second device,
receiving a first timestamp corresponding to a transmission time of the synchronize request message at the second device, wherein the first timestamp corresponds to a clock in the first device;
generating a second timestamp in the second device upon receipt of the synchronize request message, wherein the second timestamp corresponds to a clock in the second device;
transmitting a delay time request message from the second device to the first device;
generating a third timestamp in the second device corresponding to a transmission time of the delay time request message, wherein the third timestamp corresponds to the clock in the second device;
generating a fourth timestamp in the first device upon receipt of the delay time request message, wherein the fourth timestamp corresponds to the clock in the first device;
transmitting the fourth timestamp from the first device to the second device;
determining an offset time value between the clock in the first device and the clock in the second device as a function of the first timestamp, the second timestamp, the third timestamp, and the fourth timestamp;
storing the offset time value in a standard memory of the second device;
storing a copy of the offset time value in a safety memory of the second device;
transmitting a first diagnostic message from the first device to the second device at a first safety rated time based on the first clock;
transmitting a second diagnostic message from the second device to the first device at the first safety rated time based on the second clock;
generating a first diagnostic timestamp in the first device corresponding to receipt of the second diagnostic message;
generating a second diagnostic timestamp in the second device corresponding to receipt of the first diagnostic message; and
comparing the first diagnostic timestamp to the second diagnostic timestamp to verify synchronization of the first clock and the second clock.

2. The method of claim 1 further comprising the step of:
determining a safety rated time value in the second device by:
reading a time value from the second clock,
reading the copy of the offset time value from the safety memory, and
adding the copy of the offset time value from the safety memory to the time value from the second clock.

3. The method of claim 1 wherein:
the synchronize request message is received periodically at the second device,
each of the first, second, third, and fourth timestamps are generated or received in the second device responsive to each synchronize request message,
the offset time value is determined in response to each synchronize request message, and
at least one of the first diagnostic message and at least one of the second diagnostic message are transmitted between each synchronize request message.

4. The method of claim 1 further comprising the steps of:
transmitting at least one additional first diagnostic message from the first device to the second device at prescheduled safety rated times based on the first clock;
transmitting at least one additional second diagnostic message from the second device to the first device at the prescheduled safety rated times based on the second clock;
generating at least one additional first diagnostic timestamp in the first device corresponding to receipt of the at least one additional second diagnostic message;
generating at least one additional second diagnostic timestamp in the second device corresponding to receipt of the at least one first diagnostic message; and
comparing the first diagnostic timestamp to the second diagnostic timestamp and comparing each of the at least one additional first diagnostic timestamps to the at least one additional second diagnostic timestamps to verify synchronization of the first clock and the second clock.

5. The method of claim 4 wherein:
the at least one additional first diagnostic message includes either the first diagnostic timestamp or the at least one additional first diagnostic timestamp corresponding to the prior received second diagnostic message, the at least one additional second diagnostic message includes either the second diagnostic timestamp or the at least one additional second diagnostic timestamp corresponding to the prior received first diagnostic message, and
comparing the first diagnostic timestamp to the second diagnostic timestamp and comparing each of the at least one additional first diagnostic timestamps to the at least one additional second diagnostic timestamps occurs after each first and second diagnostic message is transmitted.

6. The method of claim 1 further comprising the steps of:
generating a first local clock signal with a first oscillator in the clock circuit of the second device, wherein the first local clock signal is used to generate the second timestamp and the third timestamp;
generating a second local clock signal with a second oscillator in the clock circuit of the second device; and
comparing the second local clock signal to the first local clock signal to detect drift of the first local clock signal after determining the offset time value.

7. The method of claim 1 wherein the first device includes a hardware circuit in a communication port configured to generate the first timestamp when the synchronize request message is transmitted and configured to generate the fourth timestamp when the delay time request message is received and wherein the second device includes a hardware circuit in a communication port configured to generate the second timestamp when the synchronize request message is received and configured to generate the third timestamp when the delay time request message is transmitted.

8. The method of claim 1 further comprising an initial step of scheduling communication times between the first device and the second device to minimize other network traffic when the synchronize request message and the delay time request message are being transmitted.

9. A node in an industrial control system configured to generate a safety rated time value for use in a safety rated application, the node comprising:
a communication port configured to:
connect to an industrial network,
receive a synchronize request message from a first device via the industrial network,
receive a first timestamp from the first device, wherein the first timestamp corresponds to a time signal in the first device at which the synchronize request message was transmitted,
receive a first diagnostic message at the communication port, the first diagnostic message transmitted from the first device at a first safety rated time based on the time signal in the first device, and
transmit a second diagnostic message from the communication port to the first device at the first safety rated time based on the local time signal;
a clock circuit generating a local time signal;
a processor configured to:
generate a delay time request message for transmission to the first device via the industrial network, and
determine an offset time value between the time signal in the first device and the local time signal as a function of the first timestamp, a second timestamp, a third timestamp, a fourth timestamp, wherein:
the second timestamp is a function of the local time signal and corresponds to the node receiving the synchronize request message,
the third timestamp is a function of the local time signal and corresponds to transmission of the delay time request, and
the fourth timestamp is received from the first device, corresponds to the time signal in the first device, and corresponds to reception of the delay time request at the first device;
generate a diagnostic timestamp corresponding to receipt of the first diagnostic message, and
compare the diagnostic timestamp to another diagnostic timestamp to verify synchronization of the local time signal and the time signal in the first device, wherein the other diagnostic timestamp corresponds to receipt of the second diagnostic message at the first device; and
a safety memory configured to store a copy of the offset time value.

10. The node of claim 9 wherein the processor is further configured to determine a safety rated time value by:
reading a time value from the local time signal,
reading the copy of the offset time value from the safety memory, and
adding the copy of the offset time value from the safety memory to the time value from the local time signal.

11. The node of claim 9 wherein:
the synchronize request message is received periodically at the second device,
each of the first, second, third, and fourth timestamps are generated or received in the second device responsive to each synchronize request message,
the offset time value is determined in response to each synchronize request message, and
at least one of the first diagnostic message and at least one of the second diagnostic message are transmitted between each synchronize request message.

12. The node of claim 9 wherein the processor is further configured to:
receive at least one additional first diagnostic message from the first device,
transmit at least one additional second diagnostic message from the second device to the first device, wherein the additional first and second diagnostic messages are transmitted at prescheduled safety rated times; and
compare diagnostic timestamps corresponding to reception of the at least one additional first diagnostic message and the at least one second diagnostic message to verify synchronization of the local time signal and the time signal in the first device.

13. The node of claim 9 wherein the clock circuit includes:
a first oscillator configured to generate the local time signal, and
a second oscillator configured to generate a diagnostic time signal, wherein the processor is further configured to compare the local time signal to the diagnostic time signal to detect drift of the local time signal after determining the offset time value.

14. The node of claim 9 wherein the communication port is configured to generate the second timestamp when the synchronize request message is received and configured to generate the third timestamp when the delay time request message is transmitted.

15. A method of generating a safety rated time value for use in a safety rated application, the method comprising the steps of:
determining an offset time value between a master clock and a device in the safety rated application;

storing the offset time value in a safety memory of the device;

reading a local time value from a clock circuit in the device;

generating the safety rated time as a function of the local time value and of the offset time stored in the safety memory of the device;

transmitting a first diagnostic message from another device to the device at a first safety rated time based on a clock in the other device;

transmitting a second diagnostic message from the device to the other device at the first safety rated time based on the local time value;

generating a first diagnostic timestamp in the other device corresponding to receipt of the second diagnostic message;

generating a second diagnostic timestamp in the device corresponding to receipt of the first diagnostic message; and comparing the first diagnostic timestamp to the second diagnostic timestamp to verify synchronization.

16. The method of claim 15 further comprising the steps of:

generating a first local clock signal with a first oscillator in the clock circuit, wherein the local time value is determined as a function of the first local clock signal;

generating a second local clock signal with a second oscillator in the clock circuit; and comparing the second local clock signal to the first local clock signal to detect drift of the first local clock signal after determining the offset time value.

17. The method of claim 15 wherein determining the offset time value further comprises:

receiving a synchronize request message at the device from the other device, receiving at the device a first timestamp corresponding to a transmission time of the synchronize request message, wherein the first timestamp corresponds to the clock in the other device;

generating a second timestamp in the device upon receipt of the synchronize request message, wherein the second timestamp corresponds to the local time value;

transmitting a delay time request message from the device to the other device;

generating a third timestamp in the device corresponding to a transmission time of the delay time request message, wherein the third timestamp corresponds to the local time value;

generating a fourth timestamp in the other device upon receipt of the delay time request message, wherein the fourth timestamp corresponds to the clock in the other device;

transmitting the fourth timestamp from the other device to the device; and determining the offset time value as a function of the first timestamp, the second timestamp, the third timestamp, and the fourth timestamp.

* * * * *